March 13, 1928.

B. L. COOK ET AL 1,662,417

BRAKE POWER MULTIPLYING DEVICE

Filed Sept. 7, 1926

2 Sheets-Sheet 1

INVENTORS
Byron L. Cook
BY Edward O. Hermann
Booth & Booth
ATTORNEYS.

March 13, 1928.

B. L. COOK ET AL 1,662,417

BRAKE POWER MULTIPLYING DEVICE

Filed Sept. 7, 1926

2 Sheets-Sheet 2

INVENTORS.
Byron L. Cook
BY Edward O. Hermann
Booth & Booth
ATTORNEYS.

Patented Mar. 13, 1928.

1,662,417

UNITED STATES PATENT OFFICE.

BYRON L. COOK, OF SAN MATEO, AND EDWARD O. HERMANN, OF MILL VALLEY, CALIFORNIA.

BRAKE-POWER-MULTIPLYING DEVICE.

Application filed September 7, 1926. Serial No. 133,960.

Our invention relates to that class of motion transmitting mechanisms interposed between the power and the load, under conditions wherein it is desirable to convert initial speed into increased terminal force, such devices being especially applicable to brake mechanisms, and particularly to standard hand-brake arrangements on freight cars.

The object of our invention, briefly stated, is to provide a simple, effective, durable and economical device of this nature, said object being amplified in detail in the course of the following specification.

Our invention consists in the novel combination and arrangement of parts hereinafter described.

In the accompanying drawings we illustrate our device in its preferred form, but it is to be understood that various changes may be made therein without departing from the spirit of the invention as defined by the claims hereunto appended.

Figure 1:
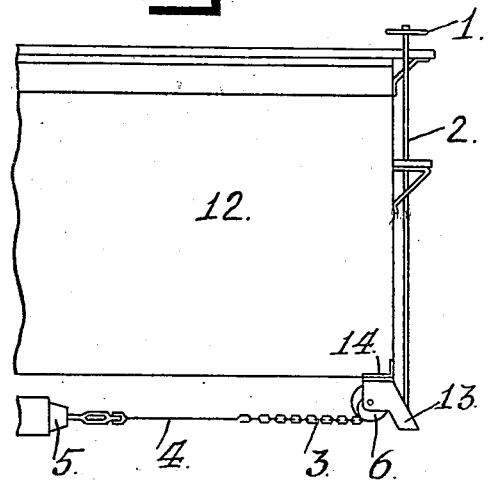

In the drawings, Fig. 1 is a fragmentary elevation of the end of a freight car equipped with a horizontal hand-brake wheel and a vertical winding shaft; and indicating the disposition of our device in the line-connection to the brake applying instrumentality, either brake levers, or as here shown, an air brake cylinder.

Figure 2:
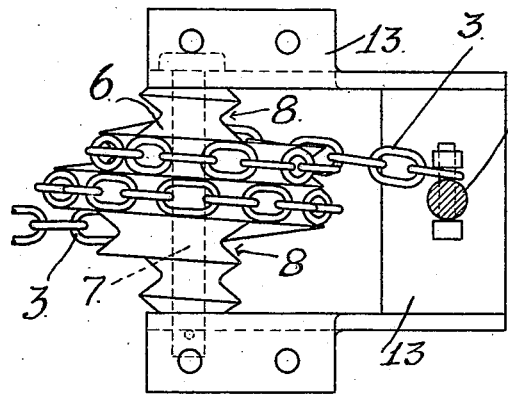

Fig. 2 is a plan view, enlarged, showing in detail the application of our drum to the continuous unbroken, line-connection, which is in its released position.

Figure 3:
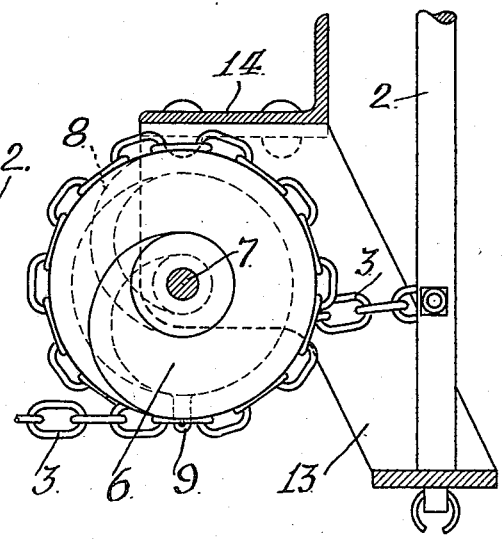

Fig. 3 is a side elevation, partly in section, of the same.

Figure 4:
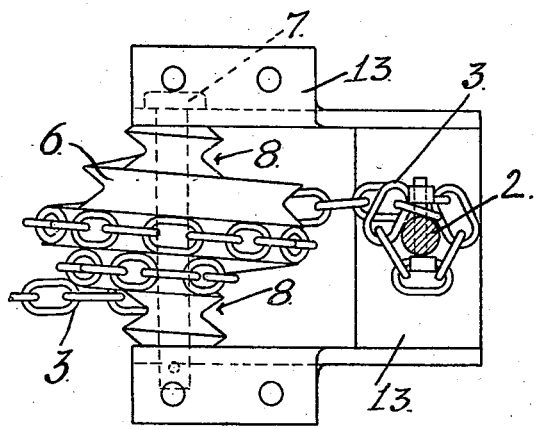

Fig. 4 is a view, similar to Fig. 3, the lineconnection being shown in its applied position.

Figure 5:
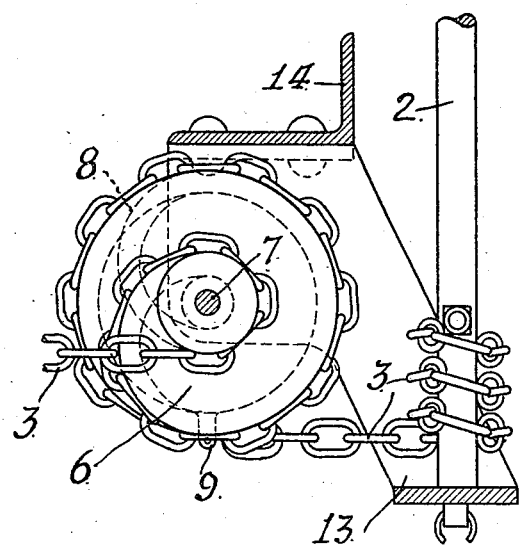

Fig. 5 is a view, similar to Fig. 4, the lineconnection being, as in Fig. 4, in its applied position.

Figure 6:
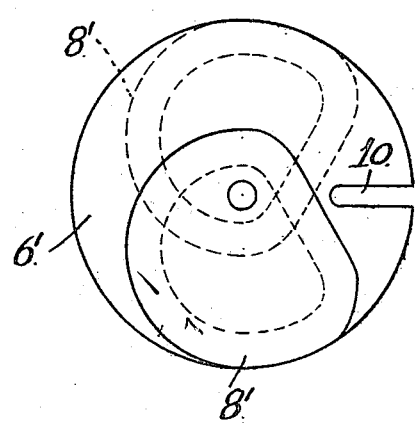

Fig. 6 is a side elevation showing a simplified form or modification of the drum.

Figure 7:
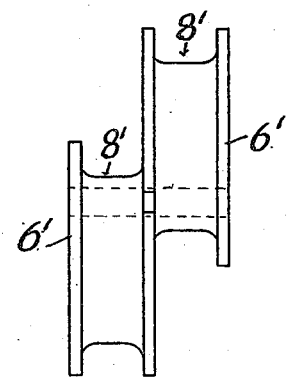

Fig. 7 is an edge view of the modified drum of Fig. 6.

1, in Fig. 1, is a horizontally disposed hand-brake wheel, the rotatable winding shaft 2 of which is vertically mounted on the end of the car 12, and is stepped below in a stirrup 13, in the usual manner.

3 is the line connection, usually a chain or cable, a chain being here shown, one end of which is fixed to and adapted to be wrapped around the foot of the shaft 2, its other end extending to the rod 4 which connects directly with brake levers, or with the air brake cylinder 5 as here shown, thus producing a horizontal pull on said levers or air cylinder.

Referring now to Figs. 2, 3, 4, and 5, we illustrate in detail our power multiplying device.

6 is a drum revolving on a pin 7 mounted in the stirrup 13.

The drum 6, which is preferably a casting, is provided with a helically directed groove 8 formed to take the chain 3. The diameter of the drum is largest at the center wrapping of the chain and decreases toward the ends, so that its basic shape may be considered a combination of two cones, or rather frustums thereof, joined at their bases.

The chain 3, instead of running directly from the shaft 2 to the brake levers or air brake cylinder, as is common practise, has approximately two windings around the drum, in such wise that it joins the drum at a larger diameter and leaves it at a smaller diameter, or vice versa. In the case here illustrated, the diameter of the chain winding at the center is assumed to be three times that at the end.

Figs. 2 and 3 illustrate the released position of the chain 3. It passes from the shaft 2 tangent to one of the small diameter ends of the drum 6, and leaves it tangent to its large diameter at the center, connecting directly or through the rod 4 to the brake levers or to the cylinder 5 as the case may be.

Upon rotating the shaft 2, the chain 3 will be wrapped around it and begin to rotate the drum 6, the small lever arm of force causing any point of the large diameter to travel a comparatively large distance. Thus, any slack in the other end of the chain 3 will be taken up immediately, one inch of pull on the chain producing a movement of three inches at the other end.

As the rotation of the drum 6 continues, the chain will mount the helical groove curve 8, passing from the small to the large diameter groove, and assuming the location shown in Figs. 4 and 5. The pull is now exerted on the large diameter of the drum, while the load or resistance has moved to the small diameter. The ratio of force to load has thus been reversed. The lever arm of force is now three times that of the arm of load, in contrast to one-third at the beginning, so that the movement effected by the device has been changed from speed at the released position of Figs. 2 and 3 into power in the applied position of Figs. 4 and 5.

An additional advantage of our drum lies in positively guiding the chain and preventing any superposed coiling on the shaft; for, as the brake is applied, the radius representing the lever arm of force increases and gradually lowers the tangent formed by the straight part of the chain between the drum and the shaft, causing a spiral winding of said chain around the shaft as shown in Fig. 5.

In order to insure the chain against slipping, any suitable link engaging irregularity may be made in the groove of the drum, such for example as indentations, or, as here indicated by the lug 9, which is preferably at a point where the chain leaves the large diameter of the drum, Figs. 3 and 5.

If the total travel of the chain from the released to the applied position requires less than one revolution, the drum may be simplified as shown in Figs. 6 and 7. The drum, in this modified form indicated by 6', consists of a double groove pulley with curves 8' similar to those 8 of the drum 6. However, the chain will then have only one winding around the drum. A slot 10 may be provided in the middle rim or web, for the chain to cross over from one groove to the other.

Although the device is herein shown as applied to some of the hand-brake arrangements used on freight cars, it may be applied to either hand or air-brake connections on passenger cars, tenders, etc.

The objects of the invention may be summarized as follows:—To reverse the relative velocity or leverage at the two ends of the chain of cable line connection, attaining speed at the beginning and increased power at the end. To positively guide the chain and prevent irregular coiling on the shaft. To change the angle or direction of the pull at any desired point.

The essential idea of means to serve these objects is the unitary member interposed in the continuous line-connection without destroying the continuity thereof, thereby eliminating additional connections between the winding-shaft and the brake-mechanism, such as gears and cams; and reducing to a minimum all points of weakness and factors of uncertainty.

The drum may be made as a single or integral piece, though foundry practice or other considerations may make it advisable to manufacture it in several pieces.

Although we have heretofore pointed out the general effect of the multiplying devices, attention is now directed to the essential novelty herein which lies in the combination of these devices with the single integral stirrup member which carries the drum and in which the brake shaft is stepped. By means of this stirrup member a fixed definite relation is established between the essential points of the brake connection, resulting in a number of new and desirable functions. This integral or fixed support, in combination with the drum shown, makes it possible to predetermine and permanently locate the following points with relation to each other.

First:—The chain fastening on the shaft on the same level with the lower point of the smaller diameter of the drum, and the bottom of the stirrup or shaft step below the lower point of the larger diameter. This permits a regular, spiral and uncoiled winding of the chain around the shaft and an unwinding or release by the gravity of the connection, equally unobstructed by any coiling.

Second:—The angularity of the drum grooves, at the position of average travel, is such as to point in the direction of the connection both to shaft and cylinder, the pin upon which the drum rotates having any desired deviation from a right angle to the longitudinal center line of the car, and the shaft receiving its permanent location to obtain a straight pull. This eliminates lateral wear of the chain on the groove flanges and the resulting friction, both in winding and unwinding.

Third:—As the length of the connection to both the shaft and the cylinder has to be determined with greatest accuracy on all brake power multiplying devices, the integral stirrup member affords an opportunity for determining this length definitely and for making the application fool proof. This may be done by securing the drum temporarily in the stirrup member against rotation by any suitable means, when measuring off and attaching the connections, the drum having the correct initial position to which it will return automatically by gravity when released.

We claim:—

In braking mechanism the combination of a stirrup member; a helically grooved oppositely tapering drum rotatably mounted in said stirrup member; a rotatable brake-shaft stepped in said stirrup member at a level below the lower level of the larger diameter of the drum; a brake-applying instrumentality; and a line-connection secured to said brake shaft at the level of the bottom of the smaller diameter of the drum and thence winding about said drum and connected with the brake-applying instrumentality.

In testimony whereof we have signed our names to this specification.

BYRON L. COOK.
EDWARD O. HERMANN.